No. 810,461. PATENTED JAN. 23, 1906.
F. H. BLACKBURN.
MACHINE FOR GLAZING AIR HOLE GLASSWARE.
APPLICATION FILED FEB. 24, 1905.
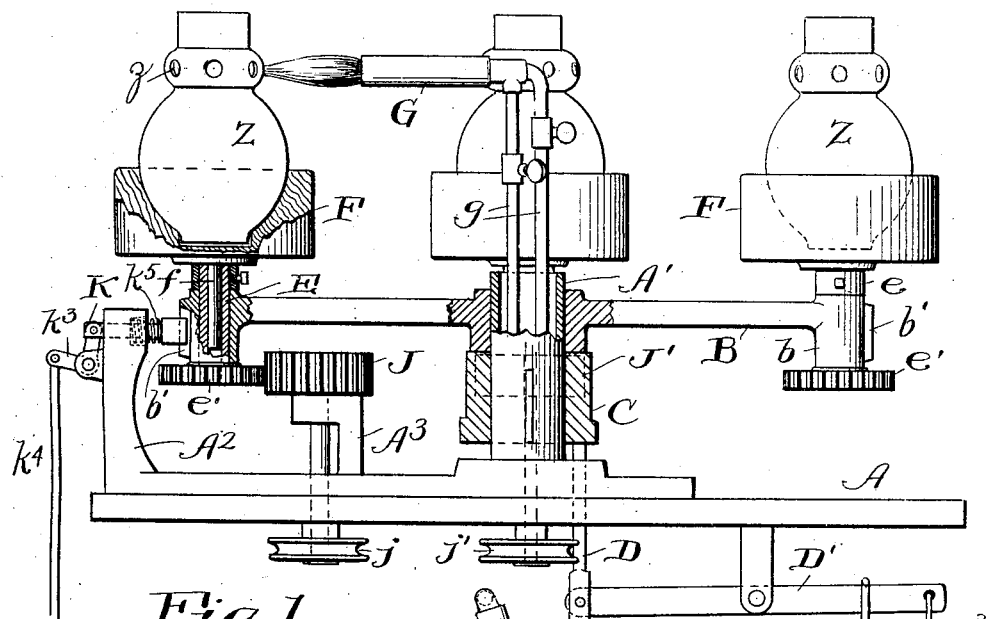
Fig. 1.
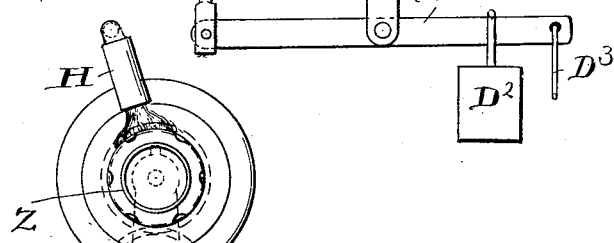
Fig. 2.
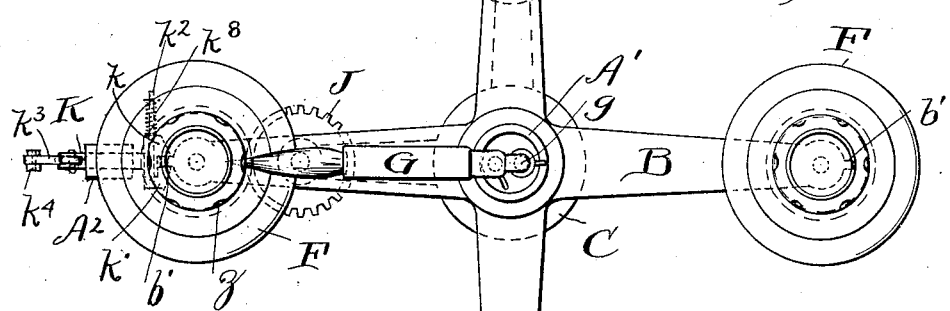
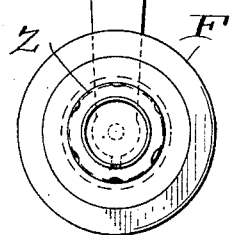
Witnesses.
E. B. Gilchrist
J. Kohn
Inventor.
Frank H. Blackburn,
By his Attorneys,
Thurlow & Bates.

UNITED STATES PATENT OFFICE.

FRANK H. BLACKBURN, OF FOSTORIA, OHIO, ASSIGNOR TO THE NATIONAL ELECTRIC LAMP COMPANY, OF CLEVELAND, OHIO, A CORPORATION OF NEW JERSEY.

MACHINE FOR GLAZING AIR-HOLE GLASSWARE.

No. 810,461.   Specification of Letters Patent.   Patented Jan. 23, 1906.

Application filed February 24, 1905. Serial No. 247,162.

*To all whom it may concern:*

Be it known that I, FRANK H. BLACKBURN, a citizen of the United States, residing at Fostoria, in the county of Seneca and State of Ohio, have invented a certain new and useful Improvement in Machines for Glazing Air-Hole Glassware, of which the following is a full, clear, and exact description, reference being had to the accompanying drawings.

The object of this invention is to provide a simple and efficient machine for glazing the holes of air-hole glassware. Such glassware, which is used largely with incandescent gas-burners, consists of a globe having a number of holes through it in a circumferential line. These holes may be primarily made by heating the globe in the spot where the hole is to be and then drawing out a horn from the globe, which is then broken off. Then after the rough edges are ground down my machine is adapted to receive the globe and glaze the holes, thereby smoothing the edges and preventing breakage.

The invention comprises the means employed in the attainment of the above ends, as hereinafter more fully explained and as definitely set out in the claims.

In the drawings, Figure 1 is a side elevation of the machine, partly broken away and sectioned in some of the parts; and Fig. 2 is a plan of the machine.

Referring to the parts by letters, A represents a suitable bed-plate, from which rises a tubular standard A'. Rotatably mounted on the tubular standard A' is a frame, shown as in the form of a spider B. The hub of this spider rests on the collar C, which is splined to the tubular standard, but is capable of an up and down movement thereon to raise or lower the spider. A link D connects the collar C with a lever D', which is preferably counterweighted, as at D², and is connected by a link D³ with a suitable treadle. (Not shown.) The counterweight does not quite balance the spider and the parts it carries, but allows them to be easily elevated by a depression of the treadle. At the end of each of the arms of the revoluble frame B are formed vertical sleeves b, in which are mounted tubular shafts E. Each shaft carries above the frame a collar e and below the frame a pinion e'. This holds the shaft in place. Seating within the bore of each shaft E is the metal shank f of a recessed block F, which is formed to receive and hold the globe to be glazed, (indicated by Z.) In the embodiment shown there are four arms to the spider, and hence four of these heads F, one of which carries the globe whose holes z are being finally glazed, another of which carries a globe which is receiving a preliminary heating. The other two holders are in the meantime having their globes put in place and removed.

G represents the burner for furnishing the glazing-flame. This burner is fed by gas and air pipes g, which extend upward through the tube A'.

H represents the burner which furnishes the preliminary heating.

Located in position to engage the pinions e', which are beneath the holders, whose globes are operated on by the burners G and H, are a pair of pinions J and J', which are continuously rotated by means of a belt (not shown) passing around pulleys j and j' on the lower ends of their shafts, which are mounted in frame-brackets A³. By this means whenever a globe F comes into juxtaposition with the flame from the burner H or the burner G the globe is given a tendency to rotate by reason of the pinion e' engaging the continuously-rotating pinion J or J'. The frictional engagement between the head F and the tubular shaft E of the pinion e' is sufficient to normally rotate the head.

The rotation is uninterrupted in front of the burner H to allow the flame from that burner to gradually heat the globe adjacent to the holes z therein. In the position in front of the flame from the burner G, which is the glazing position, the operator grasps the head F sufficiently to prevent its rotation, and thus holds the globe with the center of a hole in the vertical plane of the axis of the flame. At the same time, by means of the treadle already referred to, he raises or lowers the spider, as necessary, to bring the center of the hole into the same horizontal plane as the axis of the flame. Thus by turning the head by hand and raising and lowering the head by the treadle the globe is held with the hole accurately in position. As soon as one hole is glazed the operator releases his grasp on the head F sufficiently to allow the rotating pinion e' to form the head to bring the next hole into line with the flame. By this means all of the holes are successfully and quickly presented to the glazing-flame and each hole is properly glazed to complete the globe.

To hold the spider in position with one of the globes acted on by the burner H and the other by the burner G, I provide a latch which is adapted to engage each spider-arm as it comes into one of the definite positions. This latch is located to coöperate directly with the spider-arm which carries the globe which is acted on by the glazing-flame. This latch consists of a bar K, slidably mounted in a flame-bracket $A^2$ and having at its forward end a pair of jaws $k$ and $k'$, adapted to receive between them a lug $b'$, formed on the outer side of the sleeve $b$ at the end of each spider-arm. The jaw $k$ is rigid with the bar K; but the jaw $k'$ is loose, being held by a rod $k^2$, secured thereto and passing through the jaw $k$ and having around it a coil-spring $k^3$. When the spider is swung around from one position to another, the lug $b'$ engages the inclined face of the jaw $k$ and forces the bar K rearward, allowing the lug to enter between the jaws. The jaw $k'$ being mounted with a spring, as described, prevents too sudden stopping of the movement of the spider. At its outer end the bar K is connected by a bell-crank $k^3$ with a link $k^4$, which may be operated by a suitable treadle, (not shown,) a spring $k^5$ tending to hold the latch in engagement. When the treadle is operated, the link $k^4$ is drawn downward and the jaws release the lug $b'$, allowing the frame B to be turned by hand to bring new globes into position.

I claim—

1. The combination of a rotatable support, globe-holders carried thereby, a heating-burner adapted to direct the flame against one of the globes, a glazing-burner adapted to direct a flame which comes substantially to a point against another of said globes, and means for adjusting such latter globe with reference to the flame whereby the flame will be caused to pass centrally through a hole in the globe.

2. The combination of a rotatable support, globe-holders carried thereby, a burner adapted to direct a glazing-flame which comes substantially to a point into an opening in a globe, means for frictionally driving the globe-holder in such position, and means for simultaneously raising or lowering such globe-holder to center the hole with reference to the flame.

3. The combination of a central standard, a support rotatably mounted thereon, a gas-burner, means for conducting gas and air thereto which extend upward through said standard, globe-holders carried by said support, whereby successive globes are brought into coöperation with the flame from said burner, each globe-holder being individually rotatable on its own axis.

4. The combination of a rotatable frame, sockets mounted therein, means for rotating said sockets on their individual axes in certain positions, globe-holders having stems frictionally engaging said sockets, a heating-burner adapted to coöperate with one of the globes, and a glazing-burner adapted to coöperate with another.

5. The combination of a rotatable frame, globe-holders each consisting of a recessed block with a stem, sockets carried by said frame adapted to receive said stem, pinions on said sockets, and means for engaging said pinions in a certain position to frictionally rotate the corresponding globe-holder, and a burner coöperating with the globe carried by such holder.

6. The combination of a rotatable frame, globe-holders each consisting of a recessed block with a stem, sockets carried by said frame adapted to receive said stem, pinions on said sockets, means for engaging said pinions in a certain position to frictionally rotate the globe-holders, a heating-burner and a glazing-burner coöperating with globes carried by said holders, and means for raising or lowering said frame to adjust the position of the globe being glazed.

7. The combination of a tubular standard, a frame rotatably journaled on the standard, means for raising or lowering the frame, gas and air pipes passing upward through the standard, a burner fed thereby and located above the rotatable frame and pointing outwardly, and individual globe-holders rotatably mounted on the frame.

8. The combination of a tubular standard, a collar slidable thereon, a rotatable frame journaled on the standard and resting on said collar, means for raising or lowering the collar, gas and air pipes passing upward through the standard, a burner fed thereby and located above the rotatable frame and pointing outwardly, individual globe-holders rotatably mounted on the frame, and means for frictionally rotating said globe-holders when in position to coöperate with said flame.

In testimony whereof I hereunto affix my signature in the presence of two witnesses.

FRANK H. BLACKBURN.

Witnesses:
H. S. BLACK,
F. C. MAXHEIMER.